United States Patent Office.

JOHN J. CRAVEN, OF JERSEY CITY, NEW JERSEY.

Letters Patent No. 111,910, dated February 21, 1871.

IMPROVEMENT IN TREATING BLOOD FOR THE MANUFACTURE OF FERTILIZERS AND AMMONIACAL SALTS.

The Schedule referred to in these Letters Patent and making part of the same.

*To all whom it may concern:*

Be it known that I, JOHN J. CRAVEN, of Jersey City, in the county of Hudson and State of New Jersey, have invented a new and useful Improvement in the Treatment of Blood to Fix and Retain its Ammoniacal Properties; and I do hereby declare that the following is a full, clear, and exact description thereof, which will enable others skilled in the art to make and use the same.

It is my purpose to make use of the refuse from the manufacture of acids known as salt-cake.

To do this the salt-cake is dried or dehydrated by the proper application of heat.

The dried or dehydrated salt, which is either the bisulphate or binitrate of soda, is intimately mixed with the blood, and the whole submitted to a heat sufficient to dissolve the salt.

On cooling and exposing the mass to the atmosphere the salts recrystallize, disintegrating the blood and uniting with the salts thereof, forming a double salt of either nitrate or sulphate of soda and ammonia, which are non-volatile.

As no pressure is employed, the heretofore great loss of nitrogenous and ammoniacal matters is avoided.

Having fully described my invention,

What I claim is—

1. The process of treating blood by the use of salt-cake or its equivalent, as described.

2. The process, herein described, for obtaining ammoniacal salts from blood by treating it with salt-cake or other equivalent acid salt, substantially as described.

The above specification of my invention signed by me this 27th day of October, 1870.

JOHN J. CRAVEN.

Witnesses:
GEO. W. MABEE,
ALEX. F. ROBERTS.